Patented Oct. 24, 1944

2,360,929

UNITED STATES PATENT OFFICE 2,360,929

METHOD OF FORMING PERVIOUS CERAMIC BODIES

Emil Blaha, Cheltenham, Pa., assignor to Selas Corporation of America, a corporation of Pennsylvania No Drawing. Application April 12, 1941, Serial No. 388,348

4 Claims. (Cl. 25—156)

The general object of the present invention is to provide an improved method of providing pervious ceramic bodies.

A more specific object of the present invention is to provide a novel method of forming a rigid body or mass of pervious ceramic material having a predetermined maximum porosity.

I accomplish this by forming a substantially uniform intimate mixture of suitably divided ceramic and carbon constituents and press, mold or otherwise shape a mass of said mixture into the form of the body to be made. I then fire the mass at the temperature at which the ceramic constituents will sinter and with the mass enveloped in an atmosphere suitably inert to avoid oxidation or other chemical change of the carbon. In proceeding in the manner described, the crystallization of the ceramic material which occurs in the sintering operation will not have the effect of closing the pore spaces then occupied by the carbon particles. After the sintering action is completed, the sintered mass or body is subjected to a further firing action in an oxidizing atmosphere, with the result that the carbon in the body is thereby burned out and the spaces previously filled by the carbon are thus converted into open pores.

Porous bodies formed in the manner described may be again heated to the sintering temperature, after the pore filling carbon has been burned out, without destroying the skeleton pore walls formed by the initial sintering operation, or otherwise materially reducing the porosity of the sintered masses. Porous bodies formed in accordance with the present invention are especially useful as filters and other walls pervious to liquid and gas flow.

In forming a pervious ceramic body in accordance with the present invention, both the ceramic and carbon constituents of the mixture from which the body is formed may be in granular or comminuted form, or either constituent may be in granular or comminuted form while the other is in colloidal form. The size of the granules or particles desirably employed in forming the mixture will vary with the conditions of use and, in particular, in accordance with the desired size of the pores formed. The relative amounts of carbon and ceramic material in the mixture from which bodies are formed in accordance with the present invention may vary through quite large limits in accordance with the degree of porosity desired.

In the practice of the present invention use may be made of many different ceramic materials such as kaolin, clay, aluminum oxide, magnesium oxide, silica or mixtures thereof and, in general, of any suitable refractory oxide or mineral or compositions, such as porcelains, for example. The carbon constituent when granular may well be in the form of coke ground or broken into sufficiently fine particles, or be in colloidal form, such as lamp black or decomposed hydrocarbons.

The sintering temperatures employed will depend, of course, upon the nature of the ceramic material used, and in some cases may be as low as 2200° F. and in other cases may be as high as 3400° F. During the initial sintering operation the carbon, which is inert with respect to the ceramic material, is not physically affected and prevents the conversion of the latter into the relatively dense, impervious product which would be produced due to molecular attraction and crystallization forces induced by the temperature, if the ceramic material unmixed with carbon were subjected to the sintering operation after being initially put into a highly porous condition. The time and temperature required to burn the carbon out of the masses of ceramic material and carbon previously subjected to the sintering operation, that is, to convert the carbon from a solid to a gaseous state, will depend upon the shape and thickness of the masses as well as upon the firing cycle which may be determined by the shape of the bodies formed and the care necessary to prevent their distortion. In some cases the burning operation may be completed in fifteen minutes while in other cases it may require a period of twelve hours or so.

Since the subdivided ceramic material and comminuted material mixed therewith, such as carbon, for example, may be granular or in the form of fine particles or in colloidal form, as stated above, it is to be understood that in the claims the terms "subdivided" and "comminuted" are intended to cover all forms of ground or broken up material including material in colloidal form.

Having now described my invention, what I claim as new and desire to secure by Letters Patent, is:

1. In the art of forming a pervious ceramic body, such as a filter, for example, of desired maximum porosity with the aid of subdivided ceramic material, the improvement which includes the acts of selecting a comminuted material in which the particles thereof are in a definite size range and forming a substantially uniform intimate mixture of such comminuted material and subdivided ceramic material in a predetermined proportion determined by the maximum porosity of the ceramic body desired, said comminuted material being inert with respect to the ceramic material and possessing such physical properties that it is not shrinkable when subjected to firing in a reducing atmosphere and is burnable when subjected to heating in an oxidizing atmosphere, shaping a mass of said mixture to form the body, firing said mass to an elevated temperature in a reducing atmosphere so that substantially all of the ceramic material is sintered and undergoes crystallization, said comminuted material being substantially unaffected by said firing in a reducing atmosphere and serving as a physical barrier to counteract the tendency of said ceramic material to be converted to a relatively dense and impervious mass due to molecular attraction and crystallization forces induced by said firing, and thereafter heating said mass to an elevated temperature in an oxidizing atmosphere to burn out substantially all of said comminuted material and produce pores throughout substantially the entire body, said crystallized ceramic material remaining substantially unaffected by said heating in the oxidizing atmosphere so as to produce the pervious ceramic body having a maximum desired porosity determined by the size range of the particles of said comminuted material selected and the proportion of such comminuted material to ceramic material in said mixture.

2. The improvement set forth in claim 1 in which the comminuted material comprises carbon in colloidal form, such as lamp-black, for example.

3. In the art of forming a pervious ceramic body, such as a filter, for example, with the aid of subdivided ceramic material, the improvement which includes the acts of selecting a comminuted material, such as carbon, for example, which is inert with respect to the ceramic material and possesses such physical properties that it is not shrinkable when subjected to firing in a reducing atmosphere and is burnable when subjected to heating in an oxidizing atmosphere, forming a substantially uniform intimate mixture of said comminuted material and said subdivided ceramic material, shaping a mass of said mixture to form a body, firing said mass to an elevated temperature in a reducing atmosphere so that substantially all of the ceramic material is sintered and undergoes crystallization, said comminuted material being substantially unaffected by said firing in a reducing atmosphere and serving as a physical barrier to counteract the tendency of said ceramic material to be converted to a relatively dense and impervious mass due to molecular attraction and crystallization forces induced by said firing, and thereafter heating said mass to an elevated temperature in an oxidizing atmosphere to burn out substantially all of said comminuted material, said crystallized ceramic material remaining substantially unaffected by said heating in the oxidizing atmosphere so as to produce the pervious ceramic body having pores throughout substantially the entire mass thereof of a size depending upon the comminution of said comminuted material and the proportion of said comminuted material to ceramic material in said mixture.

4. In the art of forming a pervious ceramic body, the improvement which includes the acts of molding the body from a mixture of subdivided ceramic material and comminuted material which is inert with respect to the ceramic material and possesses such physical properties that it is not physically affected when subjected to firing in a reducing atmosphere and is converted from a solid to a gaseous state when subjected to heating in an oxidizing atmosphere, sintering all of the ceramic material by firing the body in a reducing atmosphere, and then removing all of the comminuted material by heating the body in an oxidizing atmosphere.

EMIL BLAHA.